United States Patent [19]
Davis

[11] Patent Number: 5,120,333
[45] Date of Patent: Jun. 9, 1992

[54] RECYCLING SYSTEM FOR INDUSTRIAL VACUUM MACHINE

[76] Inventor: Henry J. Davis, 1025 E. Oak St., Stockton, Calif. 95205

[21] Appl. No.: 676,837

[22] Filed: Mar. 28, 1991

[51] Int. Cl.⁵ .............................................. B01D 46/00
[52] U.S. Cl. .................................... 55/338; 55/341.2; 55/356
[58] Field of Search ...................... 55/338, 341.2, 356, 55/417

[56] References Cited

U.S. PATENT DOCUMENTS

| | | | |
|---|---|---|---|
| 2,790,509 | 4/1957 | Share | 55/341.2 |
| 3,651,621 | 3/1972 | Davis | 55/341.2 |
| 3,964,883 | 6/1976 | Nakao | 55/338 |

FOREIGN PATENT DOCUMENTS 679572  9/1952  United Kingdom ............... 55/341.2

Primary Examiner—Bernard Nozick
Attorney, Agent, or Firm—Julian Caplan

[57] ABSTRACT

Industrial vacuum machines such as those shown in U.S. Pat. No. 4,150,913 employ cloth filters in the last stage of separation of fine particles from the air stream. Such filter are cleaned inside the machine by vibration. In accordance with this invention, a baffle is movable between normal and recycling positions. In normal position the discharge of the vacuum impeller is discharged to the atmosphere. In recycling position the impeller discharge is diverted back into the primary separation chamber and then through the filters in order to remove dust and prevent its discharge to the atmosphere.

7 Claims, 1 Drawing Sheet

RECYCLING SYSTEM FOR INDUSTRIAL VACUUM MACHINE

BACKGROUND OF THE INVENTION

1. Field of the Invention

This invention relates to a new and improved recycling system for industrial vacuum machine. More particularly, the invention relates to an improvement upon industrial vacuum machines whereby dust remaining on vacuum filters after they have been cleaned by vibrating is removed by recycling air from the impeller back into the vacuum chambers and thence through the filters and thereby removing a major portion of the dirt remaining on the filter cloths from the air stream.

2. Description of Related Art

Industrial vacuum machines of the type shown in U.S. Pat. Nos. 3,651,621 and 4,150,913 remove dirt from the site through a hose discharging into the body of the machine. The body is divided into several compartments and the last compartment contains filter cloths or bags which remove the finest particles from the air stream, which is then discharged to the atmosphere. When the filters become clogged, the bags are vibrated, causing most of the dirt to fall to the bottom of the compartment whence it may be removed. However, a certain amount of dirt remains in the filters and in the near vicinity thereof. The present invention comprises an improvement whereby a considerable reduction in the dust discharged to the atmosphere is achieved.

SUMMARY OF THE INVENTION

The air which has passed through fabric filters or bags is drawn from the filter chamber by the impeller of a blower which normally discharges to the atmosphere. In accordance with the present invention, a baffle is mounted to close off the discharge to atmosphere and cause the air which contains dirt particles blown from the outside of the cleaned filters to pass through a return passage back into the primary separation chamber and thence back through the filters. Hence the remaining dust is recirculated through the filters and removed from the air stream by the cleaned filters before the air is again discharged into the atmosphere.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF PREFERRED EMBODIMENT

Figure 1:
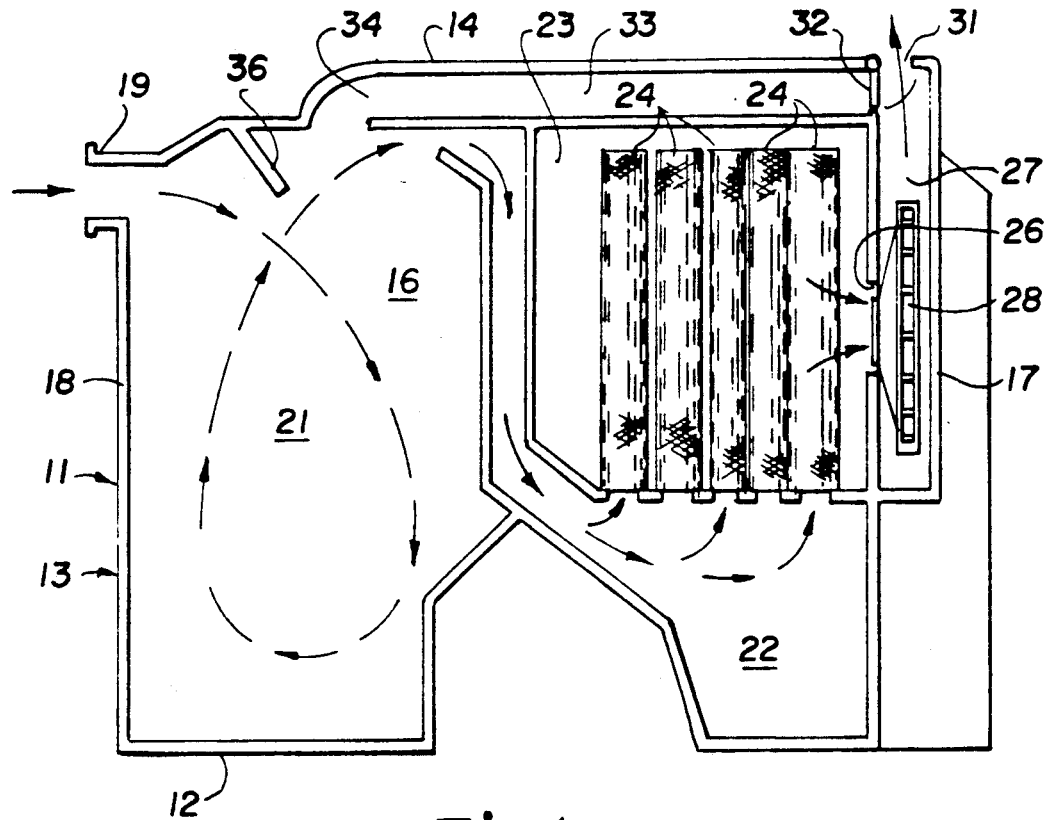
FIGS. 1 and 2 are schematic vertical sectional views through the body of an industrial vacuum machine, FIG. 1 showing the machine in normal position and FIG. 2 showing the machine in recycling position.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Vacuum machine 11 is illustrated somewhat schematically herein. Frequently such a machine is mounted on a truck chassis (not shown) but the machine 11 may also be stationary. Details of construction of the machine are shown in U.S. Pat. Nos. 3,651,621 and 4,150,913. It will be understood that other vacuum machines are in existence and the present invention is adaptable to such machines as well.

In the particular embodiment shown in the accompanying drawings, body 13 has a top 14, sides 16, back 17 and front 18. The bottom 12 is here shown adapted to fit over the rear wheels and axle of a chassis but it will be understood that other shapes may be employed. A connection 19 for a flexible vacuum hose (not shown) is disposed in the front 18. By means of compartments illustrated in the drawings or other means, the body 13 may be divided into a primary separation chamber 21 in the front discharging into a secondary separation chamber 22 at the bottom. The larger debris entering through the connection 19 fall to the bottom of the chamber 21 and smaller particles fall to the bottom of the chamber 22. By means not illustrated herein, the debris as it accumulates in chamber 21 and 22 may be periodically removed. The air in chamber 22 is drawn upward by vacuum into the filter chamber 23 and through filters or filter bags 24 disposed within the chamber 23 which remove the fine dust from the air stream. Chamber 23 has an outlet 26 which is connected to an impeller 28 which blows the air outwardly. In other words the vacuum is drawn through the hose (not shown) leading to the site by the impeller 28 causing the air and debris to circulate first through the chamber 21, then through the chamber 22 and thence through the chamber 23.

Figure 2:
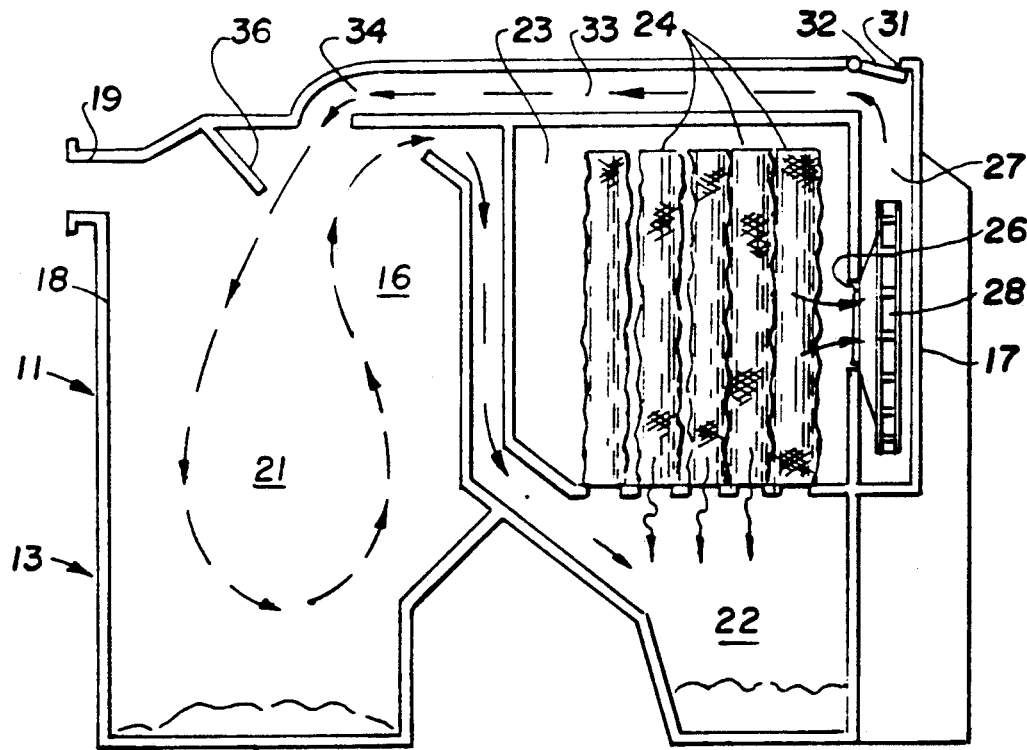

In normal operation as shown in FIG. 1, blower compartment 27 discharges into the atmosphere through outlet 31. In accordance with the present invention, a moveable baffle 32 is pivitolly mounted adjacent the outlet 31. Above filter chamber 23 is a horizontal return passage 33. With the baffle 32 in the normal operating position shown in FIG. 1, the entrance to passage 33 is closed. When the baffle 32 is swung to the position of FIG. 2, air discharged from blower compartment form 27 is diverted through the passage 33 and thence through its forward outlet 34 into the primary separation chamber 21. Stationary baffle 36 diverts the flow from outlet 34 downward into the chamber 21 rather than out through the connection 19.

In normal operation of the machine 11, an airstream drawn through the connector 19 is caused to swirl around the primary separating chamber 21 thereby causing the largest dirt components to fall to the bottom of the chamber 21. The air and remaining dirt components are drawn into the secondary separating chamber 22 where more components are caused to drop out of the air stream. The fines are drawn into the filter chamber 23 and are removed by the filters 24. The air then passes out through outlet 26, through the impeller 28 and thence up through the blower compartment 27 and its outlet 31 to the atmosphere.

When the filters 23 become clogged, the filter chamber 23 is caused to vibrate (by means not shown but well understood in the air filter art) thereby causing some of the fines entrapped in the filters 24 to drop to the bottom of compartment 22, whence they can be removed. In order to prevent the dust remaining on the exterior of the filters and remaining in the chambers 22 and 23 from being discharged into the atmosphere, baffle 32 is moved from the position of FIG. 1 to the position of FIG. 2. The impeller 28 then causes the air and dust particles in the filters 24 and compartments 22 and 23 to be pulled out by the impeller 28 and circulated from the blower compartment 27 through the passage 33 back into the primary separator chamber 21 and thence recycled through chambers 21 and 22 and thence through the filters 24. This causes the dust to be recaptured by the filters 24. Hence dust is not discharged to the atmosphere. After the dust has been cleared, the baffle 32 is restored to the position of FIG. 1 and the machine is operated normally.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An industrial vacuum machine comprising a chassis, a housing on said chassis of the type having a housing, a filter chamber in said housing, at least one separator chamber in said housing communicating with said filter chamber, an inlet communicating from a source of waste to said separator chamber, a plurality of fabric filters mounted in said filter chamber, an impeller in a blower compartment in said housing normally discharging to atmosphere through an outlet from said blower compartment arranged so that said impeller draws air and debris through said inlet into said separator chamber and thence into said filter chamber and through said filters in said filter chamber and discharges from said filter chamber through said blower compartment out said outlet, the improvement comprising a return passage in said housing adjacent said outlet and extending to said separator chamber, a baffle mounted adjacent said outlet movable between a normal position leaving said outlet unobstructed and closing off said return passage and a recycling position closing said outlet and opening said return passage to permit air from said blower compartment to flow through said return passage back to said separator chamber.

2. An industrial vacuum machine according to claim 1 in which said return passage is located above said filter chamber and extends horizontally on said body from said outlet to adjacent said inlet.

3. An industrial vacuum machine according to claim 2 which said filter chamber has an opening communicating horizontally with said impeller, said filter chamber extends vertically upward at an end of said body opposite said inlet and said outlet being located at the top of said blower compartment.

4. An industrial vacuum machine according to claim 3 in which said baffle in normal position extends vertically closing off communication between said blower compartment and said return passage and in recycling position is remote from said outlet and blocks off said return passage.

5. An industrial vacuum machine according to claim 2 which further comprises a second baffle mounted in said body to direct air from said return passage down into said separator chamber away from said inlet.

6. An industrial vacuum machine according to claim 1 in which said blower compartment is located at a first end of said housing, said separator chamber is located at a second end of said housing opposite said first end and said filter chamber is intermediate said separator chamber and said blower compartment, said return passage extending from said outlet across said filter chamber, said baffle being pivoted about an axis to pivot from a normal position blocking off said return passage and a recycling position closing said outlet and opening said return passage.

7. An industrial vacuum machine according to claim 6 in which said housing has a top and said outlet is formed in said top at the upper end of said blower compartment and said return passage is located at the top of said filter chamber.

* * * * *